P. B. STILL.
Corn and Pumpkin Planter.

No. 203,211. Patented April 30, 1878.

Attest:
Warren Seely
R. A. Dyer

Inventor:
Philip B. Still
by Geo. W. Dyer
atty.

UNITED STATES PATENT OFFICE.

PHILIP B. STILL, OF WOODSTOCK, ILLINOIS.

IMPROVEMENT IN CORN AND PUMPKIN PLANTERS.

Specification forming part of Letters Patent No. 203,211, dated April 30, 1878; application filed March 13, 1878.

*To all whom it may concern:*

Be it known that I, PHILIP B. STILL, of city of Woodstock, in the county of McHenry and State of Illinois, have invented a new and useful Improvement in Corn and Pumpkin Planters; and I do hereby declare that the following is a full and exact description of the same, reference being had to the accompanying drawings, and to the letters of reference marked thereon.

The object I have in view is the production of a pumpkin-seed-dropping attachment for corn-planting machines, which will deposit the pumpkin or other seed in the hills with the corn, and will be simple in construction; and my invention therein consists in the manner of operating the corn and pumpkin-seed dropping slides, all as fully hereinafter explained.

Figure 1:
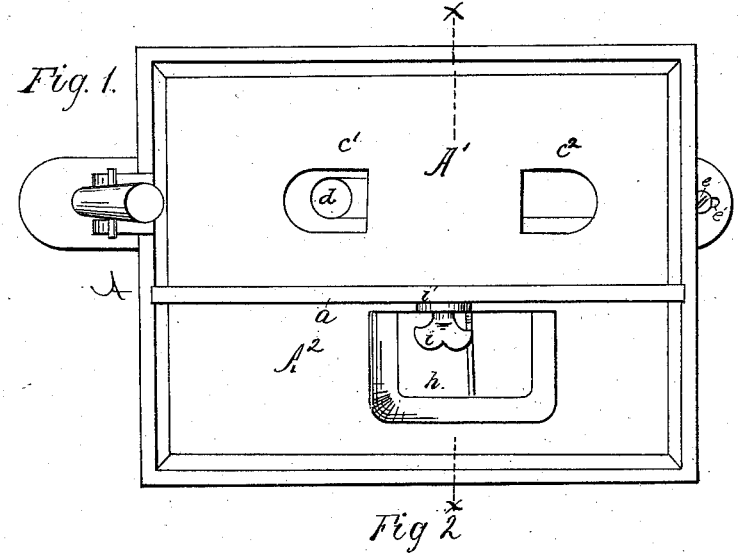
Figure 2:
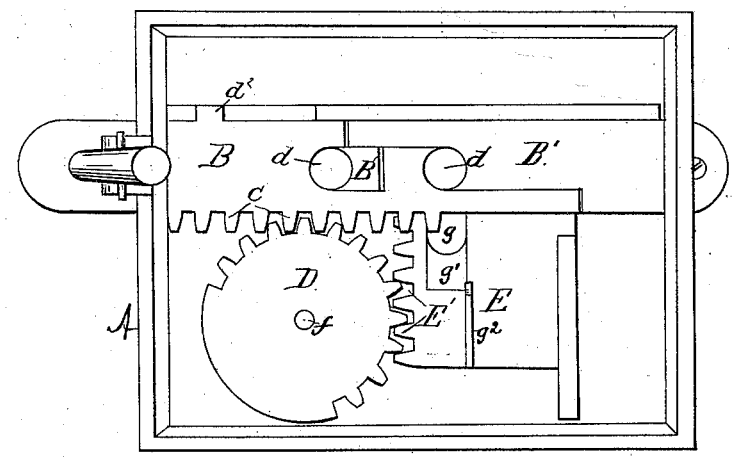
Figure 3:
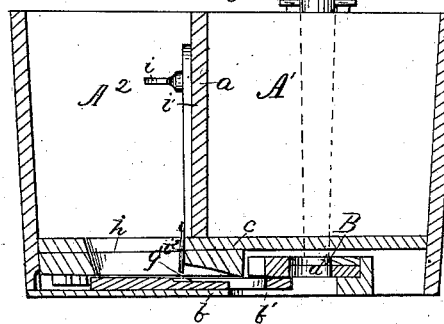

In the drawings, Figure 1 is a top view of the seed-box of a corn-planter with the pumpkin-seed attachment; Fig. 2, a top view with the bottom of seed-box removed to show the mechanism, and with the ends of the box broken away to show the entire corn-seed slide; and Fig. 3, a cross-section of the seed-box on the line $x\,x$ in Fig. 1.

Like letters denote corresponding parts.

A represents one of the seed-boxes of a corn-planter, the seed-slide of which is operated by suitable connection with the wheels or other moving parts of the machine, which is drawn by horses. This box is divided by a vertical partition, $a$, running lengthwise of the box, into two parts or chambers, $A^1\,A^2$, for the corn and pumpkin seed, the part $A^1$, for carrying the corn, being considerably larger than that for carrying the pumpkin-seed.

The box has a bottom, $b$, extending part way or entirely across the same, and through this bottom, just within the corn-chamber, is the seed-hole $b'$, connecting, when the said box is mounted for use upon a machine, with the seed spout and drill. Above this bottom $b$ is placed another bottom, $c$, extending entirely across the seed-box, and between the two bottoms is situated the mechanism for dropping the seed. The seed-slide B works through the ends of the box between the bottoms $b\,c$, and is connected, in the usual or any convenient manner, with the power for operating the drop.

This seed-slide is situated below the corn-chamber $A^1$ of the box, and just above the slide. The bottom $c$ of the box is provided with two seed-openings, $c^1\,c^2$, situated above and equally on each side of the seed-hole $b'$. The seed-slide has two seed-holes, $d\,d^1$, and a stop, $d^2$, for limiting its reciprocating movement.

The seed-holes $d\,d^1$ are adapted to have their size varied by means of a sliding piece, $B'$, which is laid on top of the seed-slide, and forms one-half of each seed-hole, and can be adjusted, by means of a screw and slot, $e\,e'$, nearer to or farther away from the other sides of the holes, so as to diminish or increase the size of these holes, according to the number of grains of corn desired to be planted in each hill.

On the side of the slide B next to the partition $a$ is placed a rack, C, which meshes with a cog-wheel, D, mounted on a short spindle, $f$, near one end of the box, and this cog-wheel, in turn, engages with a rack, $E'$, on the side of the pumpkin-seed slide E, situated at right angles to the seed-slide B; and by these means it will be seen that the motion of the corn-seed slide is transmitted to the pumpkin-seed slide through the medium of the cogged wheel, so that they move at right angles to each other.

The slide E is made quite thin, and its end operates over the seed-hole $b'$, below the slide B. This slide E has a depression, $g^1$, and seed-hole $g$ in line with the seed-hole $b'$, and with a seed-opening, $h$, in the bottom $c$, directly above such depression and hole, and within the pumpkin-seed chamber of the box. A rib, $g^2$, is formed on the top of the slide E, which works in a slot made in a block on the under side of the bottom $c$, so as to guide such slide and always keep the seed-holes in line. On the side of the partition $a$, within the chamber $A^2$, is placed a narrow piece, $i$, which is vertically adjustable upon such partition by means of a thumb-screw, $i^1$. This piece $i$ projects into the seed-opening $h$, and is provided on its end with an elastic strip, $i^2$, which hangs above the slide E in the line of movement of the seed-carrying holes and depressions $g\,g^1$, and regulates the dropping of the pumpkin-seed. This piece $i$ can be adjusted vertically to vary the number of seed planted by the slide E.

It will be noticed that the corn-seed slide, carrying two seed-holes, operating in each direction toward the lower seed-hole, makes a deposit of seed at each motion of the slide, while the pumpkin-seed slide, which has but one seed-hole, and operates only in one direction toward and away from the lower seed-hole, deposits the seed only when moved forward, so that the desired amount of pumpkin-seed will be planted in the alternate hills of corn.

This device is simple in its construction, and adds very little to the expense of a corn-planter, and at the same time is certain in its operation.

What I claim as my invention is—

1. The seed-box A, divided into two parts to contain the corn and pumpkin seed, in combination with the seed-slides B E, moving at right angles to each other over a common seed-opening, substantially as described.

2. The corn-seed slide B, reciprocated by connection with the power of the machine, in combination with the pumpkin-seed slide E, operated at right angles to the corn-seed slide by connection with such slide, substantially as described and shown.

3. In a corn and pumpkin planter, the combination, with a two-compartment seed-box, of the corn-slide B, having two seed-openings, so as to drop seed at each stroke, and the pumpkin-slide E, operated at right angles to the corn-slide over the same seed-opening, and provided with a single seed-opening, adapted to drop the pumpkin-seed only on the forward stroke, substantially as described and shown.

4. The combination of the seed-slides B E, racks C E', and cog-wheel D, substantially as and for the purpose set forth.

This specification signed and witnessed this 25th day of February, 1878.

PHILIP B. STILL.

Witnesses:
 EDMUND BALDWIN,
 JAMES M. IRISH.